(12) United States Patent
Fort et al.

(10) Patent No.: US 7,683,699 B2
(45) Date of Patent: Mar. 23, 2010

(54) CHARGE PUMP

(75) Inventors: Jimmy Fort, Provence (FR); Fabrice Siracusa, Provence (FR)

(73) Assignee: ATMEL Corporation, San Jose, CA (US)

( * ) Notice: Subject to any disclaimer, the term of this patent is extended or adjusted under 35 U.S.C. 154(b) by 0 days.

(21) Appl. No.: 11/855,520

(22) Filed: Sep. 14, 2007

(65) Prior Publication Data
US 2009/0072889 A1   Mar. 19, 2009

(51) Int. Cl.
*H03K 3/01* (2006.01)
*G05F 1/10* (2006.01)
(52) U.S. Cl. .......................... 327/536; 327/537
(58) Field of Classification Search .......... 327/534–537
See application file for complete search history.

(56) References Cited

U.S. PATENT DOCUMENTS

| | | | |
|---|---|---|---|
| 5,889,428 A | 3/1999 | Young | |
| 6,154,088 A * | 11/2000 | Chevallier et al. | 327/536 |
| 6,515,535 B2 | 2/2003 | Myono | |
| 6,661,278 B1 | 12/2003 | Gilliland | |
| 6,831,499 B2 * | 12/2004 | Oddone et al. | 327/536 |
| 6,864,739 B2 | 3/2005 | Shor et al. | |
| 6,888,400 B2 * | 5/2005 | Lin et al. | 327/536 |
| 7,046,076 B2 | 5/2006 | Daga et al. | |
| 7,102,422 B1 * | 9/2006 | Sawada et al. | 327/536 |
| 7,123,077 B2 | 10/2006 | Chiu et al. | |
| 7,256,642 B2 * | 8/2007 | Kimura | 327/537 |
| 7,323,926 B2 | 1/2008 | Chen et al. | |
| 2002/0122324 A1 | 9/2002 | Kim et al. | |
| 2005/0264342 A1 | 12/2005 | Park et al. | |
| 2006/0273843 A1 | 12/2006 | Daga | |

* cited by examiner

*Primary Examiner*—Dinh T. Le
(74) *Attorney, Agent, or Firm*—Fish & Richardson P.C.

(57) ABSTRACT

An improved charge pump design useful in low power applications derives an alternative voltage from a supply voltage. The design can be constructed using PMOS manufactured according to standard processes such that triple well manufacturing processes are not required. The design can incorporate control gate circuitry to increase efficiency and decrease degradation due to the threshold voltage of the transistors used.

22 Claims, 4 Drawing Sheets

CHARGE PUMP

TECHNICAL FIELD

This invention relates to electrical circuits.

BACKGROUND

Charge pump circuits are used to provide a voltage that is higher than the voltage of a power supply or to reverse its polarity. Charge pumps are commonly used in memory devices, such as a flash memory and Electrically Erasable Programmable Read-Only Memory (EEPROM). Charge pump circuits are also used in other devices to increase dynamic range and simplify design.

One common charge pump design is a Dickson charge pump. FIG. 1 shows an example of a Dickson charge pump 100. Each stage of the Dickson charge pump 100 is made of a capacitor and a n-channel metal-oxide-semiconductor field-effect (NMOS) transistor N1, N2, N3, N4, or N5 acting as a diode. The transistors have their bulk connected to the ground. Each of the NMOS transistors N2, N3, N4, N5 connects a drain terminal and gate terminal together to a stage capacitor C1, C2, C3, C4, respectively. As shown, the source terminals of the NMOS transistors N1, N2, N3, N4 are connected to the stage capacitor of the next stage. Two inverted phase clock Φ and Φ' are used. The maximum gain per stage is VDD-VT, where VT is the threshold voltage of the NMOS devices.

As the supply voltage VDD decreases with advanced technologies, the pumping efficiency of such charge pump is decreased. Moreover, the body effect increases the threshold voltage of the NMOS devices. As the drop between the NMOS source and bulk increases, the number of stages that can be cascaded is limited. Another drawback of such structure is that thick oxide, high voltage transistors are necessary to sustain a large drop between the gate and the bulk in a reliable way. This prevents the design of such a circuit using thin oxide, low voltage standard devices that can sustain a maximum drop of VDD.

SUMMARY

This specification describes technologies related to charge pump circuits.

In general, one aspect of the subject matter described in this specification can be embodied in circuits that include a first and second half pump stages including p-type devices. In implementations, the half pump stages can be assembled to create a multi-stage charge pump device. The use of control gate phase inputs can increase gate voltages of transistors in the circuit to enhance a switching performance of the transistors by reducing degradation in performance due to a threshold voltage of the transistors. The design provides an efficient, low voltage, charge pump that can be constructed with standard components.

DESCRIPTION OF DRAWINGS

Like reference symbols in the various drawings indicate like elements.

DETAILED DESCRIPTION

Example Charge Pump Stage

Figure 1:
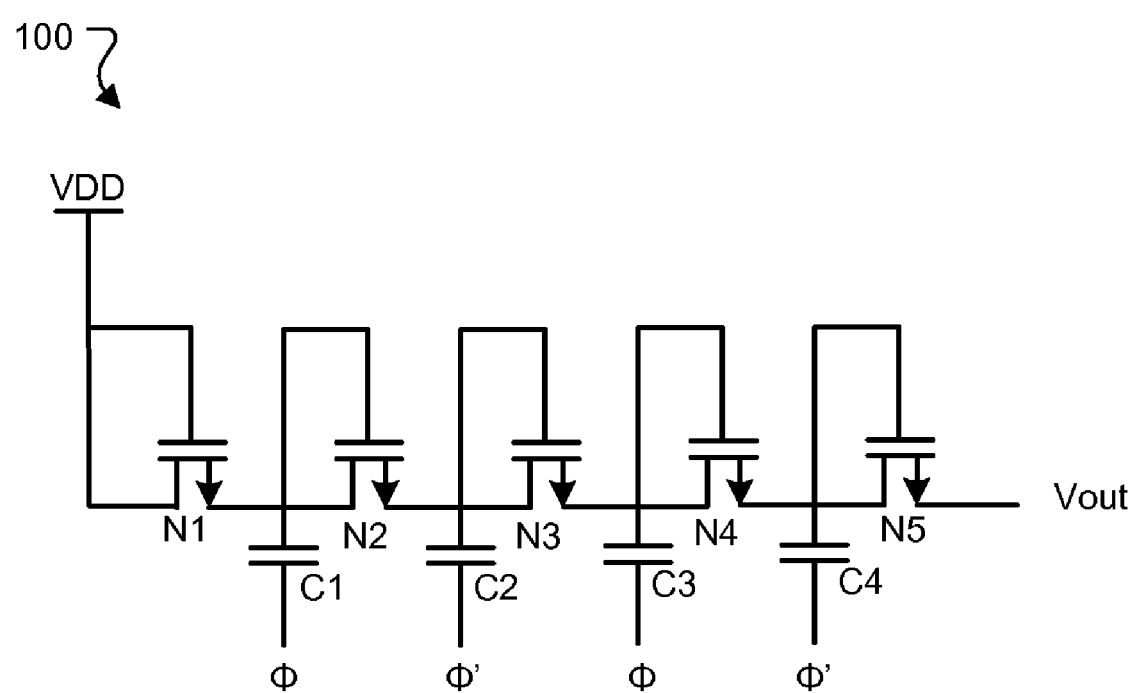
FIG. 1 is a schematic diagram showing an example of a Dickson charge pump.
Figure 2:
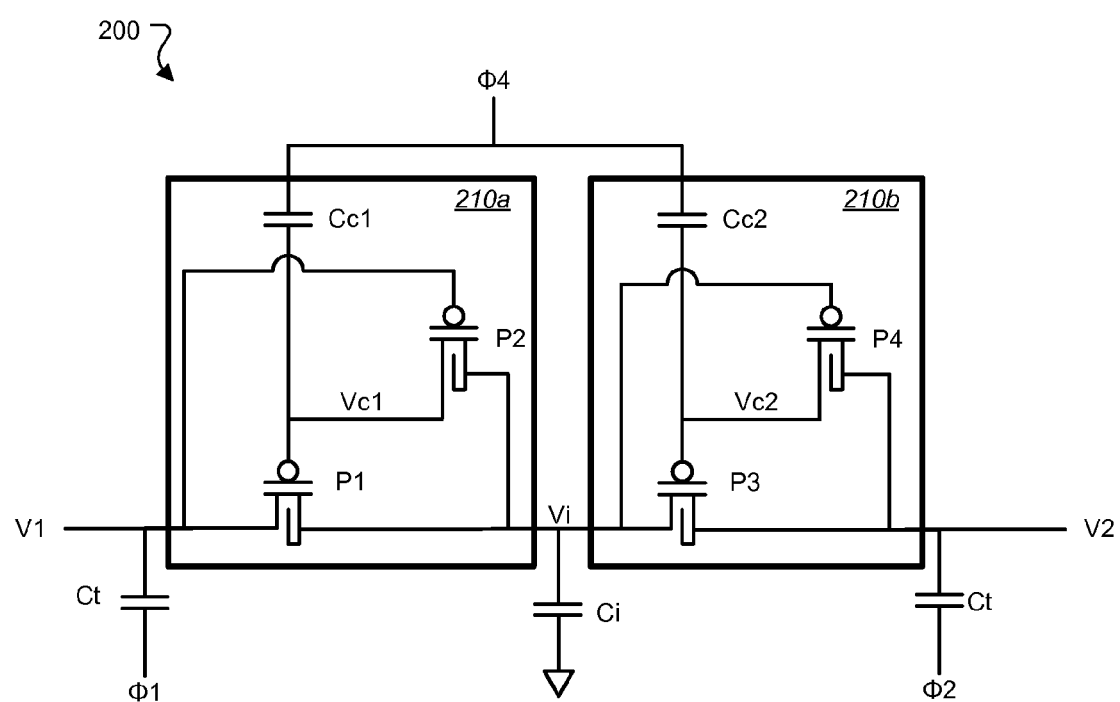
FIG. 2 is a schematic diagram showing an example of a pump stage of a charge pump.

Low voltage p-type metal-oxide-semiconductor field-effect transistor (PMOS) devices can be used to realize transistor switches in charge pump circuits. FIG. 2 shows an example of a charge pump stage 200 that includes PMOS switches P1, P2, P3, P4. In some examples, the charge pump stage 200 operates while maintaining a maximum voltage drop across any one transistor equal to or less than a supply voltage VDD. In some implementations, the charge pump stage 200 can operate with a low supply voltage. For example, VDD may be less than 1.2 V.

The charge pump stage 200 includes two half pump stages 210a, 210b. The half pump stage 210a includes the PMOS transistors P1 and P2, and a control gate capacitor Cc1. The gate of P2 is connected to the source of the P1, which defines a pump stage input node. The drain of P2 is connected to the drain of Pl, which defines an intermediate node. One lead of Cc1 is connected to the gate of P1. The half pump stage 210b includes the PMOS transistors P3 and P4, and a control gate capacitor Cc2. The gate of P4 is connected to the source of the P3 and to the intermediate node. The drain of P4 is connected to the drain of P3, which defines an output node. One lead of Cc2 is connected to the gate of P3. Cc1 and Cc2 can supply a boost voltage (e.g., 2 VDD) to the gate terminals of P1 and P3, respectively. Using the boost voltage, P1 and P3 can mitigate gain degradation due to the threshold voltages of P1 and P3.

The charge pump stage 200 includes phase inputs Φ1, Φ2, and Φ4. In each phase of operation, the charge pump stage 200 receives a different combination of voltage inputs at the phase inputs Φ1, Φ2, and Φ4. Some example combinations are described below with reference to FIG. 4. In implementations, the phase inputs Φ1, Φ2, and Φ4 can be coupled to an external device, such as a controller circuit. The controller circuit can determine voltage levels at various nodes (e.g., V1, V2, Vi, etc.) in the charge pump stage 200. Based on the voltage level, the controller circuit can, for example, select a phase of operation and generate the input voltages corresponding to the selected phase of operation at the phase inputs Φ1, Φ2, and Φ4. In some examples, each of the phase inputs Φ1, Φ2, and Φ4 are connected to a clock generator. For example, a clock generator can generate repetitive signals to the phase inputs Φ1, Φ2, and Φ4 to operate the charge pump stage 200. The charge pump stage 200 includes two transfer capacitors Ct and a capacitor Ci. Ci can be used to stabilize voltage at a node Vi.

In operation, the charge pump stage 200 transfers charge from a node V1 to a node V2 based on the phase inputs Φ1, Φ2, and Φ4. As an illustrative example, the nodes V1, V2, Vc1, Vc2, and Vi may be initialized to VDD. In a first phase of operation, Φ1 and Φ4 are set to approximately VDD and Φ2 is set substantially close to 0 V. Due to capacitor coupling at V1, the voltage at V1 is set to VDD+ΔV. In some implementations, Ct has a high capacitance so that ΔV is substantially close to VDD. Similarly, the voltage at V2 is set to VDD−ΔV due to capacitor coupling at V2. In some examples, the voltage at Vi is maintained at VDD in this phase. Therefore, a voltage drop on the drain-source of the PMOS transistors P1, P2, P3, P4 can be maintained at or below VDD. Because the voltage drop is maintained at or below VDD, the PMOS transistors P1, P2, P3, and P4 can be, in some examples, low voltage standard PMOS that are manufactured using thin oxide layers. In this phase, P1 is turned on and a charge transfer occurs between Ct and Ci. After the charge transfer, the voltage at V1 decreases to VDD+Vt, where Vt is a threshold voltage of the PMOS devices used.

At this point, Φ4 is set to 0 V and the charge pump stage 200 begins a second phase of operation. Due to capacitor coupling of Cc1 and Cc2, the voltages at the nodes Vc1 and Vc2 are decreased to VDD−$\Delta V_{c1,2}$. For example, a magnitude of $\Delta V_{c1,2}$ may depend on the capacitance of Cc1 and Cc2. Because Vc1 and Vc2 are decreased, P1 and P3 are turned on. Therefore, a charge transfer occurs between the two Ct. In this phase, the gate-source voltage of P1 and P3 is around VDD to reduce degradation effects in the switching transistors P1 and P3 due to threshold voltages.

Example Charge Pump

Based on predetermined parameters, a number of charge pump stages 200 can be cascaded together to generate a desired output voltage. For example, a flash memory device may specify an output voltage of 11 V with an input voltage of 1 V. To meet the example voltage specification, ten charge pump stages 200 can be cascaded to generate a voltage close to 11 V (e.g., 10.88 V).

Figure 3:
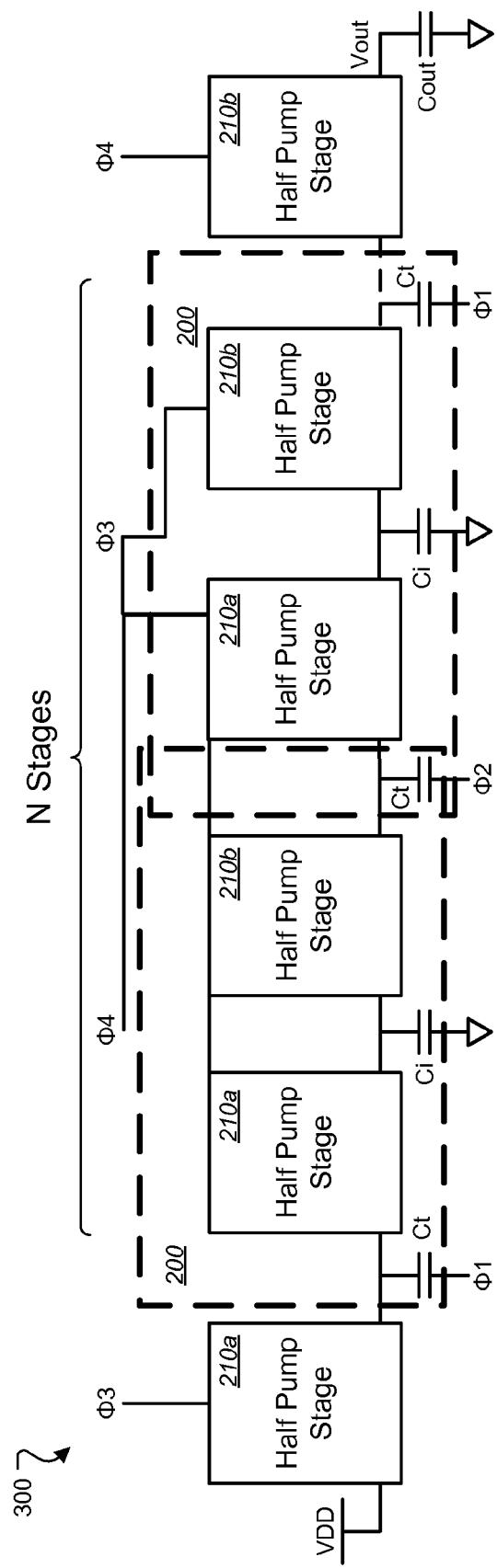
FIG. 3 is a schematic diagram showing an example of a N-stage charge pump.

FIG. 3 is a schematic diagram showing an example of a charge pump 300 having N charge pump stages 200. In this example, the charge pump 300 receives supply voltage VDD and supplies output voltage at Vout. With N stages, the charge pump 300 can supply the output voltage at around (N+1)·VDD. The node Vout is coupled to a capacitor Cout in order to accumulate charges from previous stages.

Figure 4:
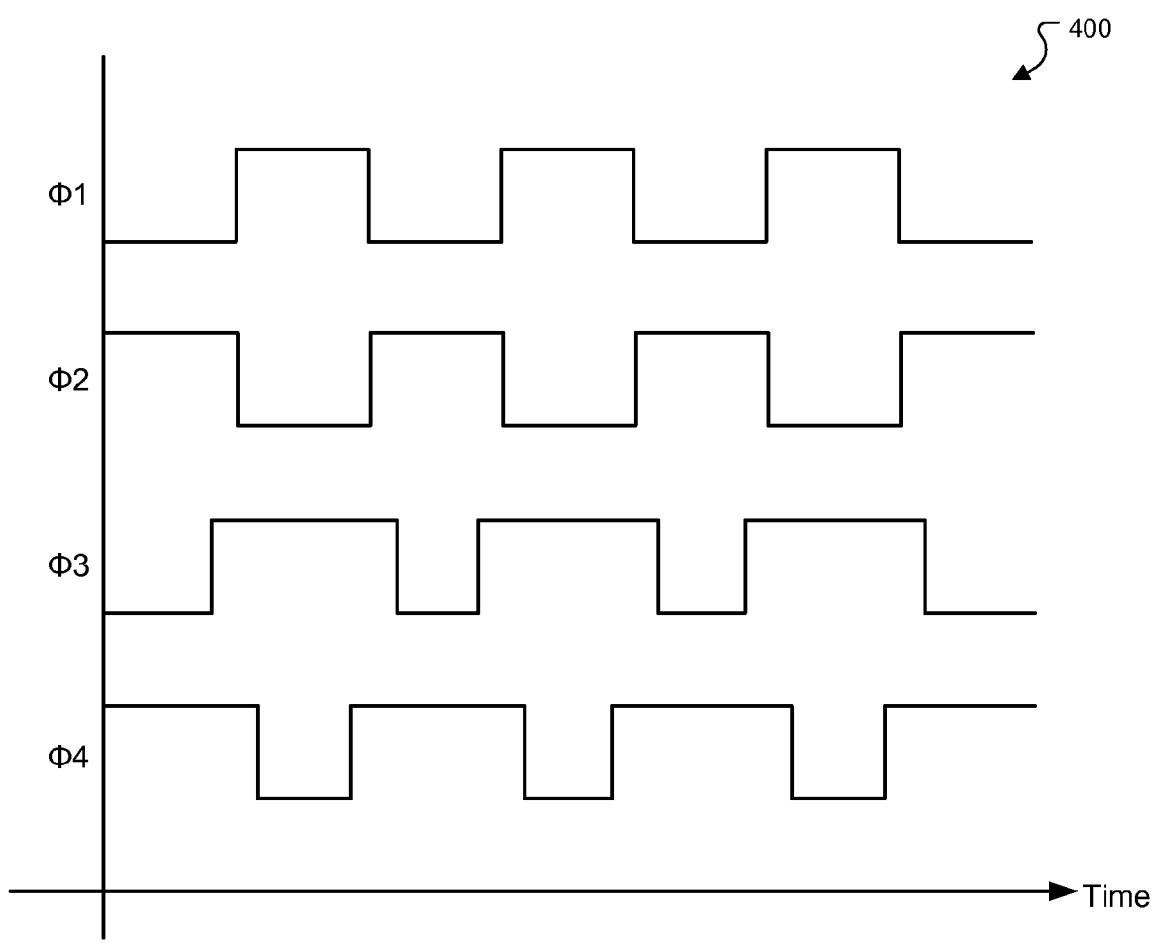
FIG. 4 is a graph showing an example of phase inputs for the N-stage charge pump.

The charge pump 300 operates based on received voltages at phase inputs Φ1, Φ2, Φ3, and Φ4. As shown, each of the charge pump stages 200 includes the phase inputs Φ1 and Φ2. Each of the charge pump stages 200 also includes the phase input Φ3 or the phase input Φ4. In the depicted example, the charge pump stage 200 uses the phase input Φ3 if the previous charge pump stage 200 uses the phase input Φ4. The charge pump stage 200 uses the phase input Φ4 if the previous charge pump stage 200 uses the phase input Φ3. FIG. 4 shows a graph 400 of example phase inputs Φ1, Φ2, Φ3, and Φ4 used to operate the charge pump 300.

Example Phase Inputs

As shown in FIG. 4, the phase inputs Φ1, Φ2 are inverted phase clocks. In some implementations, the phase inputs Φ1, Φ2 can have a fixed frequency controlled by a controller. The phases Φ1, Φ2 can be generated by a clock circuit and an inverter circuit. The phase inputs Φ3, Φ4 can be controlled by a controller or a feedback circuit to boost the gate voltages of P1 and P3 in the pump stages 200. The phases Φ3, Φ4 can also be supplied by clock circuits having predefined duty cycles and frequencies.

By supplying a boosted voltage at the gate terminals of P1 and P3, the charge pump 300 can avoid gain degradation and improve efficiency. Additionally, the charge pump 300 can be implemented using low voltage PMOS devices by limiting the voltage drop in the PMOS devices to be less than or equal to VDD.

In some implementations, the charge pump stage 200 uses the same or substantially the same structure as a Dickson charge pump with advanced switches that allow for an efficient charge transfer principle and good parasitic effects. Using PMOS devices in the charge pump stage 200, the charge pump 300 can be implemented using low voltage devices because the voltage drop in the transistors can be maintained at or below VDD. P2 and P4 can refresh the nodes Vc1 and Vc2, respectively, in each clock cycle of the phase inputs Φ1, Φ2.

Using standard devices, the cost for manufacturing the charge pump stage 200 is reduced as compared to alternative charge pump designs. For example, no triple well fabrication is required to manufacture the charge pump stage 200.

A number of implementations of the invention have been described. Nevertheless, it will be understood that various modifications may be made without departing from the spirit and scope of the invention. Accordingly, other implementations are within the scope of the following claims.

The invention claimed is:

1. A circuit comprising:
 a first half charge pump stage comprising:
  a first p-type device;
  a second p-type device having a gate connected to a source of the first p-type device defining a pump stage input node and having a drain connected to a drain of the first p-type device defining an intermediate node; and
  a first control gate capacitor having a first lead connected to the gate of the first p-type device and the source of the second p-type device; and
 a second half charge pump stage comprising:
  a third p-type device;
  a fourth p-type device having a gate connected to a source of the third p-type device, directly connected to the drain of the first p-type device and to the drain of the second p-type device, and the fourth p-type device having a drain connected to a drain of the third p-type device defining an output node; and
  a second control gate capacitor having a first lead connected to the gate of the third p-type device and the source of the fourth p-type device, and having a second lead connected to a second lead of the first control gate capacitor.

2. The circuit of claim 1, wherein:
 a second lead of the first control gate capacitor defines a control gate phase input node.

3. The circuit of claim 1, wherein:
 the p-type devices are PMOS thin oxide transistors.

4. The circuit of claim 1, further comprising:
 a first transfer capacitor having a first lead connected to the input node and a second lead defining a first phase input; and
 a second transfer capacitor having a first lead connected to the output node and a second lead defining a second phase input.

5. The circuit of claim 4, further comprising:
 an intermediate capacitor having a first lead connected to the intermediate node and a second lead connected to a ground.

6. The circuit of claim 4, wherein:
 an application of a first waveform to the first phase input and an application of a second waveform to the second phase input causes the circuit to transfer a charge from the input node to the output node.

7. The circuit of claim 6, wherein:
 the second waveform is an inverse of the first waveform.

8. The circuit of claim 6, wherein:
 the second waveform is a phase shifted copy of the first waveform.

9. The circuit of claim 4, wherein the p-type devices are PMOS thin oxide transistors.

10. The circuit of claim 4, wherein a voltage drop across any of the first, second, third, and fourth p-type devices during operation is less than a supply voltage.

11. The circuit of claim 4, wherein the circuit transfers a charge from the input node to the output node during operation.

12. A multi-stage charge pump circuit comprising:
a first half pump stage connected to an input node;
N pump stages having respective control gate phase inputs, the control gate phase inputs operable to receive control gate waveforms during operation to increase a switching efficiency of transistors in a respective stage of the N pump stages, wherein at least one of the N pump stages comprises:
a first p-type device;
a second p-type device having a gate connected to a source of the first p-type device and having a drain connected to a drain of the first p-type device;
a third p-type device;
a fourth p-type device having a gate connected to a source of the third p-type device, directly connected to the drain of the first p-type device and to the drain of the second p-type device, and the fourth p-type device having a drain connected to a drain of the third p-type device;
a first transfer capacitor having a first lead connected to the source of the first p-type device and the gate of the second p-type device, and having a second lead defining a first phase input;
a second transfer capacitor having a first lead connected to the drain of the third p-type device and the drain of the fourth p-type device, and having a second lead defining a second phase input different from the first phase input; and
a last half pump stage connected to an output node.

13. The circuit of claim 12, wherein:
a first control gate waveform is applied to a first stage during operation; and
a second control gate waveform is applied to a second stage connected to and following the first stage, the second control gate waveform comprising a phase shifted copy of the first control gate waveform.

14. The circuit of claim 13, wherein:
the first and second control gate waveforms are alternately applied to consecutive stages.

15. The circuit of claim 12, wherein:
an output voltage provided at the output node is approximated by (N+1) multiplied by a supply voltage.

16. The circuit of claim 12, wherein:
a supply voltage is applied to the input node during operation, and the circuit transfers charge from the input node to the output node.

17. The circuit of claim 12, wherein:
the supply voltage is one volt or less.

18. The circuit of claim 12, wherein a voltage drop across any of the first and second p-type devices of the circuit is less than a supply voltage during operation.

19. The circuit of claim 12, wherein the p-type devices are PMOS thin oxide transistors.

20. A circuit comprising:
a first half charge pump stage comprising:
a first p-type device;
a second p-type device having a gate connected to the source of the first p-type device defining a pump stage input node and having a drain connected to a drain of the first p-type device defining an intermediate node;
a first control gate capacitor having a first lead connected to the gate of the first p-type device and the source of the second p-type device;
a second half charge pump stage comprising:
a third p-type device;
a fourth p-type device having a gate connected to the source of the third p-type device and directly connected to the intermediate node and having a drain connected to a drain of the third p-type device defining an output node;
a second control gate capacitor having a first lead connected to the gate of the third p-type device and the source of the fourth p-type device;
a first transfer capacitor having a first lead connected to the input node and a second lead defining a first phase input;
a second transfer capacitor having a first lead connected to the output node and a second lead defining a second phase input; and
a second lead of the first control gate capacitor and a second lead of the second control gate capacitor are connected and define a control gate phase input node.

21. The circuit of claim 20, wherein:
an application of a first waveform to the first phase input and an application of a second waveform to the second phase input causes the circuit to transfer a charge from the input node to the output node.

22. The circuit of claim 21, wherein:
the second waveform is an inverse of the first waveform.

* * * * *